United States Patent [19]
Bisel et al.

[11] Patent Number: 5,574,340
[45] Date of Patent: Nov. 12, 1996

[54] ELECTRICAL AND ELECTROMAGNETIC ROTARY MOTOR APPARATUS AND METHOD UTILIZING SELF-GENERATED SECONDARY ELECTRICAL ENERGY

[76] Inventors: Charley W. Bisel, 286 E. 12th Ave., Broomfield, Colo. 80501; Alvin Simpson, 437 W. Scott, Clovis, Calif. 93612

[21] Appl. No.: 241,420

[22] Filed: May 11, 1994

[51] Int. Cl.⁶ ................................................. H02P 7/00
[52] U.S. Cl. ........................ 318/34; 318/443; 318/254; 318/498
[58] Field of Search ................. 318/34–49, 430–500, 318/800–830, 138, 254, 259, DIG. 2; 290/4, 52, 2, 45; 322/29, 9, 23, 324; 310/113, 112, 156, 91, 74, 157, 114, 102 R

[56] References Cited

U.S. PATENT DOCUMENTS

| | | | |
|---|---|---|---|
| 3,609,426 | 9/1971 | Gaul | 310/112 |
| 3,955,858 | 5/1976 | Poubeau | 308/10 |
| 4,085,355 | 4/1978 | Fradella | 318/168 |
| 4,100,942 | 7/1978 | Tschudi | 139/1 R |
| 4,168,459 | 9/1979 | Roesel, Jr. | 322/29 |
| 4,211,452 | 7/1980 | Poubeau | 308/10 |
| 4,218,624 | 8/1980 | Schiavone | 290/45 |
| 4,283,957 | 8/1981 | Zobrise et al. | 73/814 |
| 4,309,620 | 1/1982 | Beck | 290/4 R |
| 4,405,031 | 9/1983 | Rotter | 180/165 |
| 4,406,950 | 9/1983 | Roesel, Jr. | 290/4 C |
| 4,412,170 | 10/1983 | Roesel, Jr. | 322/4 |
| 4,444,444 | 4/1984 | Benedetti et al. | 308/10 |
| 4,458,156 | 7/1984 | Maucher et al. | 290/38 B |
| 4,540,930 | 9/1984 | Siedband | 322/4 |
| 4,597,463 | 7/1986 | Barnard | 180/165 |
| 4,626,696 | 12/1986 | Maudner et al. | 290/38 R |
| 4,629,921 | 12/1986 | Gavaletz | 310/156 |
| 4,663,536 | 5/1987 | Roesel, Jr. et al. | 290/7 |
| 4,703,188 | 10/1987 | Gottfried | 290/38 B |
| 4,723,735 | 2/1988 | Eisenhaure et al. | 244/165 |
| 4,827,152 | 5/1989 | Farkas | 307/68 |
| 4,870,339 | 9/1989 | Furukawa et al. | 322/29 |
| 4,885,492 | 12/1989 | Van Sickle | 310/113 |
| 4,931,715 | 6/1990 | Lee et al. | 318/709 |
| 5,036,930 | 2/1991 | Bisel et al. | 180/65.1 |
| 5,192,899 | 3/1993 | Simpson et al. | 318/139 |
| 5,258,697 | 11/1993 | Ford et al. | 318/498 |
| 5,301,764 | 4/1994 | Gardner | 180/65.2 |
| 5,311,062 | 5/1994 | Farkas | 290/4 R |
| 5,355,061 | 10/1994 | Forhan | 318/443 |

*Primary Examiner*—Paul Ip
*Attorney, Agent, or Firm*—Victor Flores

[57] ABSTRACT

A rotary motor including the combination of an electromagnetically powered first motor and an electrically powered second motor. The first motor and the second motor being mechanically coupled to each other via a common drive shaft for delivery of produced rotary power. The first motor member includes at least one radially disposed electronically pulsed ON/OFF electromagnet member that magnetically couples to a rotatable permanent magnet member disposed on a flywheel member attached to the common drive shaft. The second motor member being electrically coupled to the first motor member for receiving secondary electrical energy produced from back-emf and/or electric power generated by induction at the electromagnet member. The second motor member is adapted with a flywheel member having embedded permanent magnets that influence the flux fields that surround the rotating armature and stator poles to enhance performance of the second motor. The rotary motor may be mechanically coupled to a vehicle via the common drive shaft to propel the vehicle.

11 Claims, 6 Drawing Sheets

ELECTRICAL AND ELECTROMAGNETIC ROTARY MOTOR APPARATUS AND METHOD UTILIZING SELF-GENERATED SECONDARY ELECTRICAL ENERGY

FIELD OF THE INVENTION

The present invention relates to electrical motors and electromagnetically driven rotary motor apparatus. Even more particularly, the present invention relates to the electrical-mechanical structures, electromagnetic structures, combinations and interconnections of electrical and electromagnetic motor apparatus.

DESCRIPTION OF THE PRIOR ART

Electric motors have replaced many machine application formerly relying on the internal combustion engines, and while they have also enjoyed much technological advances, they have not been perfected to the point of replacing the greatest source of pollution, namely the automobile engine, (see Wall Street Journal Article entitled: "GM Says It Plans an Electric Car, but Details Are Spotty", page B1, dated Thursday Apr. 19, 1990). The electric motor traditionally requires large battery units to continually produce rotating drivetrain power, and as alluded to in the Wall Street article, the electric motor has yet to be commercially attractive as an alternative engine technology.

Further, while electromagnetically driven motors have been proposed as improvements to the electric motor, see generally U.S. Pat. Nos. 5,192,899 and 5,036,930 concerned with electromagnetically driven motor apparatus, the underlying technology has not been developed to a level that attracts industry to invent the resources to make a transition to electromagnetic motors. Further, the structures taught by U.S. Pat. Nos. 5,192,899 and 5,036,930 have been quite bulky, consistent with underlying materials properties associated with implementing electromagnetic structures. Further, difficulties have been experience by focusing motor development using only one technology. For example, the rotary motor apparatus taught by U.S. Pat. No. 5,192,899 teaches that permanent magnets embedded in a flywheel may be combined with pulsating ON/OFF electromagnets to effect rotary motion. However, the full benefit of the pulsating ON/OFF magnetically powered rotary motor is not achieved until a substantial rotational speed is reached, and that disadvantages exist at initial start-up in that a significant amount of energy is required to produce a high torque. Further, smoothing-out of the rotating body is not achieved until several electromagnets have been radially placed about the periphery of the flywheel.

Similarly, development in electric motors has been focused on electric motor technology, and while the electric motor has had some industry success in replacing the combustion engine, the long term requirement of large battery units to continually produce rotating drivetrain power has delayed wider acceptance of the electric motor as being the choice apparatus for propelling automobiles. The high energy efficiency attribute of the pulsating ON/OFF electromagnetic rotary motor, at speeds beyond initial start-up, is appealing to solve the long term requirement of large battery in present electric car design. However, certain design attributes of the electric motor are also seen as having appeal in electromagnetic rotary motor technology. For example, the initial high torque capability of an electric motor is an appealing attribute to include in the design of an electromagnetic rotary motor. To applicant's knowledge, there is no motor device that captures the synergism of the combination of electrical and electromagnetic rotary motor technology.

Therefore, a need is seen to exist for a rotary motor apparatus that combines electric motor technology and electromagnetic motor technology to form a rotary motor apparatus comprising a combined electric/electromagnetic motor technology that includes electrical-mechanical structure, electromagnetic structure for achieving high, long term energy efficiency features of the electromagnetic motor, and achieving high torque capabilities of the electric motor.

A need is still seen to exist for a rotary motor apparatus that combines electric motor technology and electromagnetic motor technology to form a rotary motor apparatus comprising a combined electric/electromagnetic motor technology having high horsepower ratings, speed and torque without the polluting disadvantages of an internal combustion engine.

A need is seed to exist for an electric motor that is magnetically adapted to yield higher speed and adapted for being combined with an electromagnetic rotary motor to form a combined electric/electromagnetic rotary motor apparatus.

SUMMARY OF THE INVENTION

According, the primary object of the present invention is to provide a rotary motor apparatus that combines electric motor technology and electromagnetic rotary motor technology.

A related object of the present invention is form a rotary motor apparatus comprising combined electric and electromagnetic rotary motor technology that includes electrical-mechanical structure, electromagnetic structure for achieving high, long term energy efficiency features of the electromagnetic rotary motor, and achieving high torque capabilities of the electric motor.

A related object of the present invention is to form a rotary motor apparatus comprising combined electric and electromagnetic rotary motor technology with enhanced performance due to utilization of self-generated secondary electrical energy derived as back-emf energy and generated electrical energy from the electromagnets in the apparatus.

Another object of the present invention is to provide a rotary motor apparatus that combines electric motor technology and electromagnetic rotary motor technology to form a rotary motor apparatus comprising a combined electric/electromagnetic motor technology having high horsepower ratings, speed and torque without the polluting disadvantages of an internal combustion engine.

A related object of the present invention is to provide an electric motor that is magnetically adapted to yield higher speed and adapted for being combined to with an electromagnetic rotary motor to form a combined electric/electromagnetic rotary motor apparatus.

Another related object of the present invention is to provide a vehicular apparatus that utilizes a rotary motor having the foregoing objects.

Yet another object of the present invention is to provide a method of driving a common driveshaft using a rotary motor having the foregoing objects.

The present invention provides the foregoing objects by providing a rotary motor apparatus comprising at least one electromagnetically powered first motor member and at least one electrically powered second motor member. Each at least one first motor member and each at least one second motor member being mechanically coupled to each other via a common drive shaft for delivery of rotary power. Each at least one first motor member comprising at least one radially disposed electronically pulsed ON/OFF electromagnet member that magnetically couples to at least one permanent magnet member disposed on a flywheel member attached to the common drive shaft. The radially disposed electromagnets are secured to a frame and are effectively the stator for each of the at least one first motor member. The combination flywheel and permanent magnets and common drive shaft are effectively the rotor for each of the at least one first motor member. Each at least one second motor member being electrically coupled to the at least one first motor member for receiving secondary electrical energy in the form of electric power produced from back-emf and/or electric power generated from the at least one electromagnet member to enhance rotational speed and torque output power of the rotary motor apparatus. The second motor member is adapted with a flywheel member disposed adjacent an armature member. The second motor's flywheel member is adapted with imbedded permanent magnets that influence the flux fields that surround the rotating armature and stator poles of the electrically powered second motor member.

In one application, a control circuit for the rotary motor apparatus delivers power from a power source to the second motor member to initiate rotation of the common power shaft. Subsequently, the control circuit energizes the electromagnetic rotary motor (first motor member) for continuous operation and de-energizes the electric motor (second motor member) to conserve on energy. Further energizing of the electric motor member is controlled by the operator and may be selectively powered from a secondary electric power source originating as back-emf energy from the first motor member. The electric power from the back-emf circuit may also be used to charge the primary power source. If the operator had not energized the electromagnetic motor, the rotating flywheel with embedded permanent magnets associated with the electromagnetic rotary motor would produce electrical energy by induction action on the de-energized electromagnet members. The generated electric power as a secondary power source may be directed to the electric motor, or back to the primary power source via the charging circuit.

Therefore, to the accomplishments of the foregoing objects, the invention consists of the foregoing features hereinafter fully described and particularly pointed out in the claims, the accompanying drawings and the following disclosure describing in detail the invention, such drawings and disclosure illustrating two of the various ways in which the invention may be practiced.

DESCRIPTION OF THE PREFERRED EMBODIMENT

Figure 1:
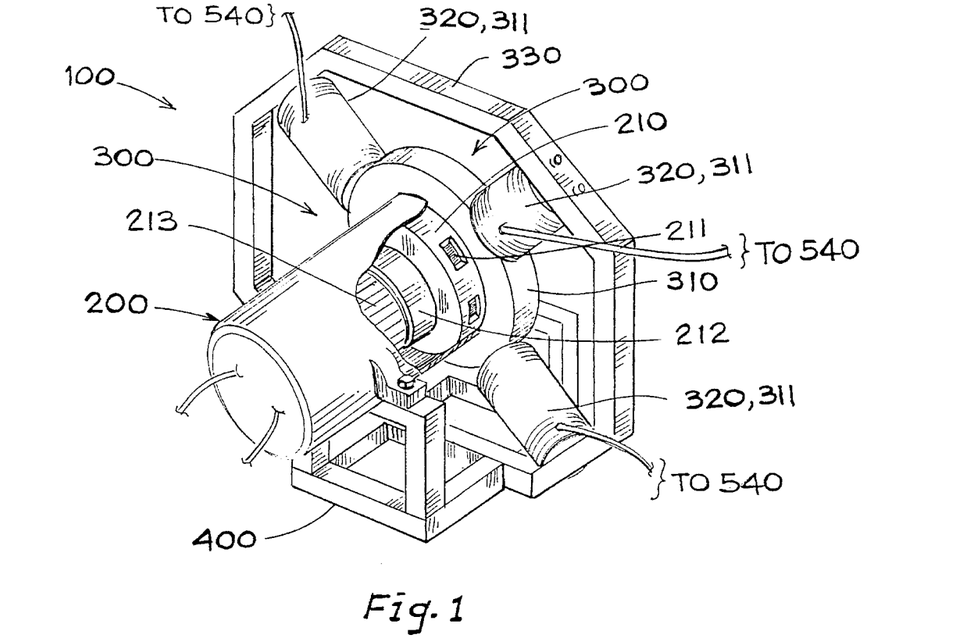
FIG. 1 is a perspective rear view of the present invention illustrating a rotary motor apparatus which includes an electromagnetically driven first motor member coupled to an electrically driven second motor member.

FIG. 1 illustrates a rotary motor apparatus 100 which includes an electromagnetically driven first motor member 300 coupled to an electrically driven second motor member 200. First motor member 300 and second motor member 200 are mechanically coupled to each other via a common drive shaft 110 for delivery of rotary power and are supported by frame 400, by example only.

Although not shown, the arrangement of first and second motors 200, 300, as illustrated in FIG. 1, may be axially extended along drive shaft 110 to include a plurality of similarly arranged motors. The description of the preferred embodiment will be limited to the illustrated arrangement, but is not intended to limit the scope of the invention.

Still referring to FIG. 1, first motor member 300 comprises at least one radially disposed electromagnet member 320, supported by a support collar structure 330, and which is magnetically coupled to at least one permanent magnet member 311 disposed on a flywheel 310 attached to common drive shaft 110. Second motor member 200 is electrically coupled to first motor member 300 for receiving secondary electrical energy from the electromagnet members 320. The secondary electrical energy is produced, either by electrical energy generated by induction caused by flywheel 310, with embedded permanent magnets 311, rotating by de-energized electromagnet members 320, or by the electrical back-emf energy produced by the collapsing magnetic fields of the electromagnet members 320 that are periodically de-energized during operation of first motor member 300.

Figure 2:
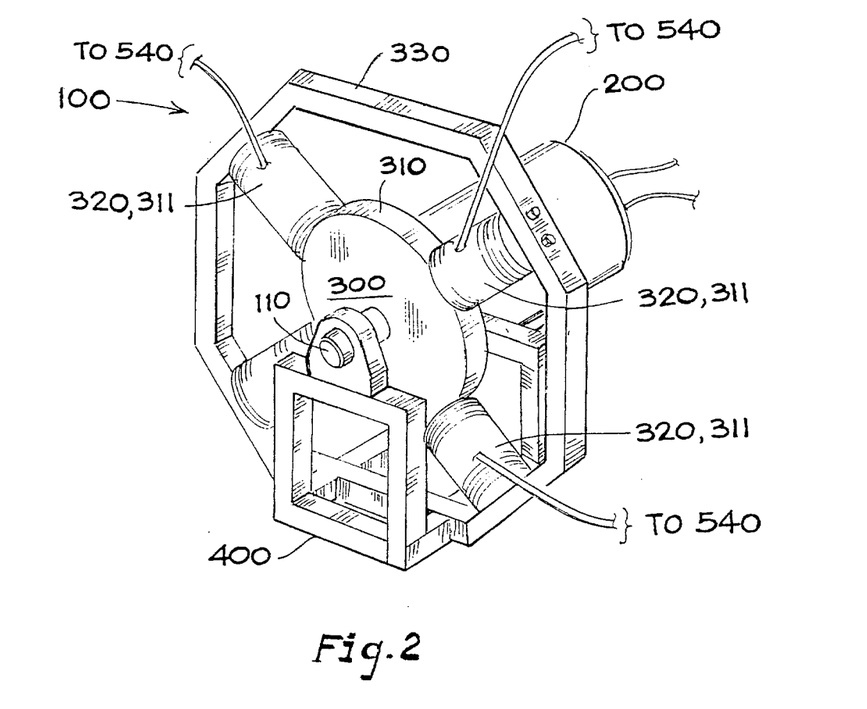
FIG. 2 is a perspective opposing view of the rotary motor apparatus shown in FIG. 1, illustrating a common power output shaft and the arrangement of the first motor member's electromagnets disposed about a flywheel containing permanent magnets.
Figure 11:
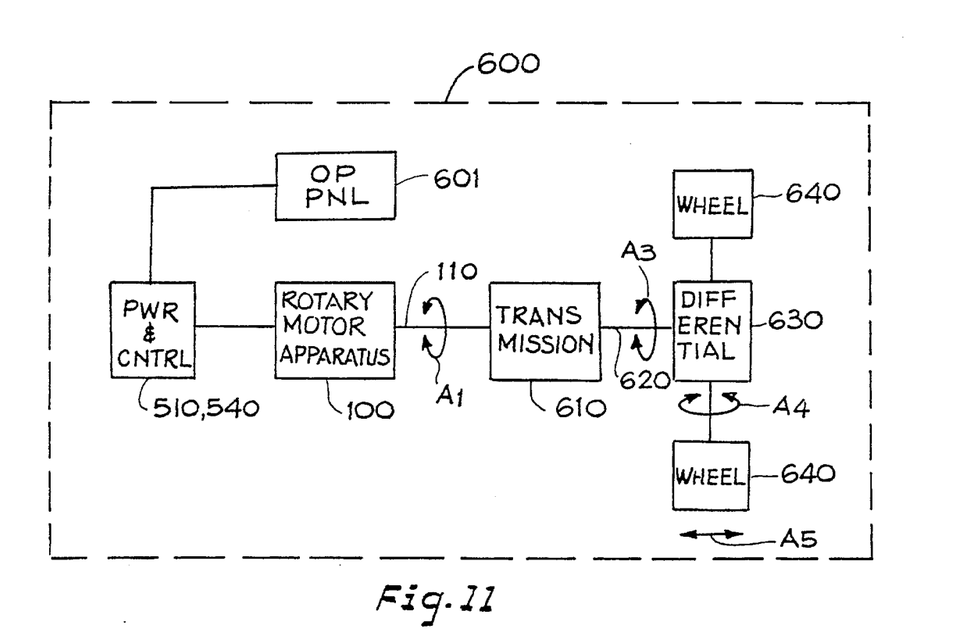
FIG. 11 is a block diagram depicting the present invention as a component of a vehicle's drivetrain for producing propulsion.

FIG. 2 is an opposing view of rotary motor apparatus 100 shown in FIG. 1 and shows common power output shaft 110 for attachment of a load, such as a vehicle drivetrain 610, 620, 630 and 640, as illustrated in FIG. 11, or for extending the number of first and second motor members 300, 200, as previous discussed. Electromagnets 320 are arranged radially about flywheel 310 and are depicted as being four units, by example only. Electromagnets 320 may be provided in larger number to effect a smoother and more stable mode of operation of rotating flywheel 310. The number of embedded permanent magnets 311 would be correspondingly increased to effect the enhanced mode of operation.

Figure 8:
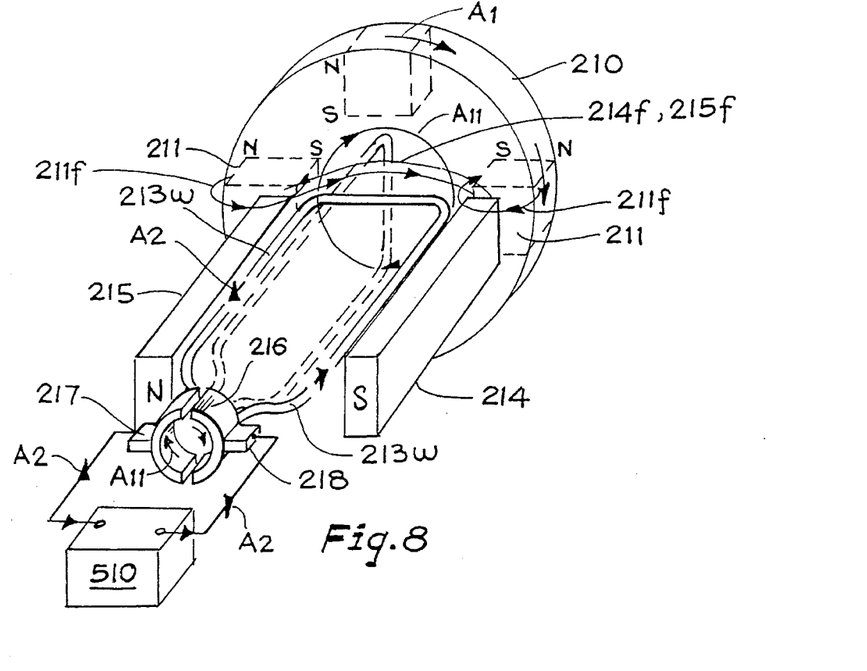
FIG. 8 is an electrical/mechanical diagram of the electrically driven second motor showing the current flow through the armature causing rotation of the power shaft and also showing the magnetic flux field interaction between the rotating flywheel member and the stator magnetic poles that enhances performance of the second motor.

FIG. 1 additionally shows second motor member 200 having an armature member 213, a magnetic flux transfer collar 212, and an adjacent flywheel member 210, which includes a plurality of permanent magnets 211 embedded around a periphery of flywheel member 210. The magnetic structure 210, 211, as best illustrated in FIG. 8, is configured to rotate with armature 213 for purposes of having the magnetic flux fields 211$f$ interact with magnetic flux fields 214$f$, 215$f$. The polarities of stator 214 and 215 are depicted 214(S), 215(N), by example only. The polarity of magnets 211, as embedded in flywheel 210, are depicted as 211(N) outer position and 211(S) inner position, by example only, and generate flux fields 211$f$ that complement flux fields 214$f$, 215$f$. The interaction, as observed on a working apparatus, is believed to cause an amplification of the magnetic flux, in the direction of rotation A1, to cause an increase in rotational speed, when compared to a similar motor without magnetic structure 210, 211 and 212, and with respect to the applied voltage at brushes 217, 218. The interaction of the fields is believed to also dampen the magnetic flux fields along the core of armature 213 such that a reduction in the heat produced by the armature has been observed when compared to a similar motor without magnetic structure 210, 211, and 212. FIG. 8 additionally shows armature wiring 213$w$ electrically coupled to commutator 216 and brushes 217, 218 and powered from power source 510. The magnetic structure is responsive to current flow A2 to produce rotation A1, A11.

Figure 3:
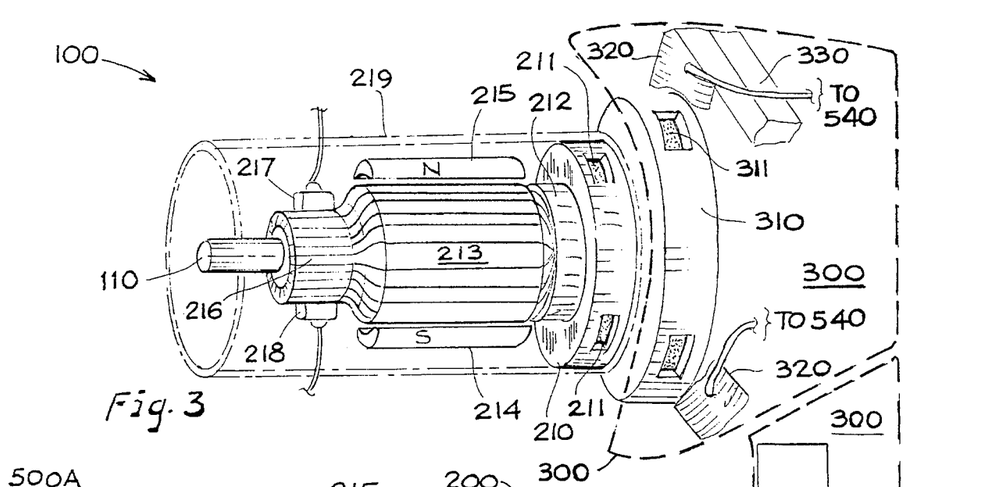
FIG. 3 is a partial perspective side view of the rotary motor apparatus shown in FIG. 1 illustrating in particular in cutaway view the second motor's flywheel with embedded permanent.
Figure 9:
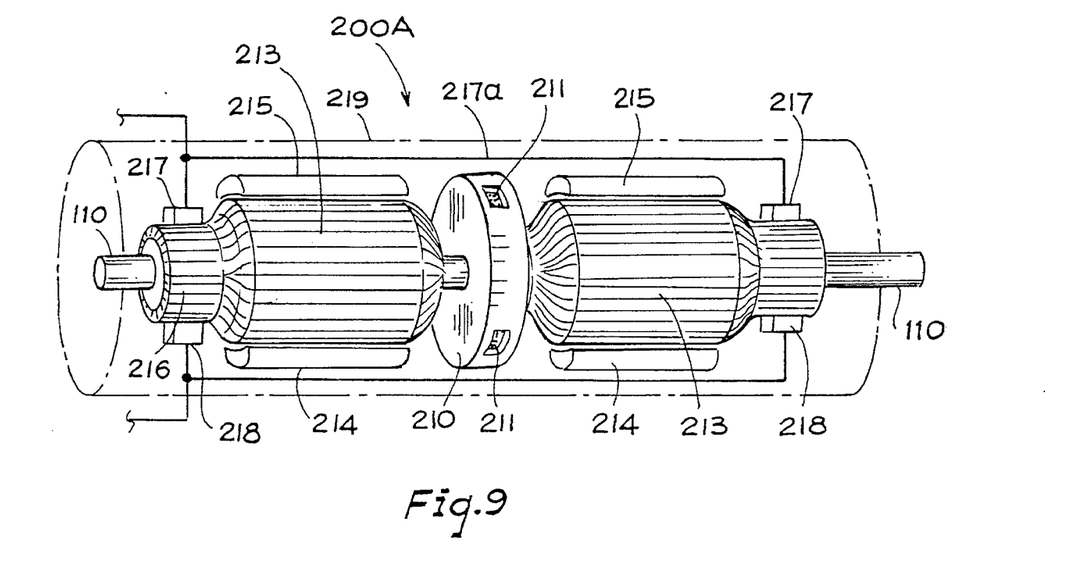
FIG. 9 is a cutaway side view of a dual armature electric motor shown with an interspaced flywheel with embedded permanents that enhance performance of the electric motor by magnetic flux field interaction with the stator poles.

FIG. 3 illustrates a side view of apparatus 100 showing in particular second motor member 200 comprising enclosure 219, magnetic poles 214, 215, armature 213, commutator 216, brushes 217 218, magnetic flux transfer collar 212, flywheel member 210 with embedded permanent magnets 211. Motor member 200 is mechanically coupled to electromagnetic motor 300 via the common driveshaft 110. FIG. 9 illustrates an alternate embodiment 200A of a second motor member 200. As illustrated, motor 200A comprises a dual armature 213 and stator 214, 215 arrangement with a flywheel 210 disposed in between. Brushes 217, 218 are electrically coupled via wiring 217$a$. The object of having flywheel 210 and permanent magnets 211 positioned in between the armature and stators is to capitalize on the benefit of having the magnetic flux fields 211$f$, see FIG. 8, interacting with flux fields 214$f$, 215$f$ on each side of flywheel 210. The speed and torque performance of motor embodiment 200A are enhanced in comparison with the speed and torque performance of motor 200 for the same reasons previously discussed for motor 200. The dual armature and stator arrangement depicted in FIG. 9 can be further enhanced by adding additional flywheel and permanent magnets structure 210, 211 flanked by additional armature and stator arrangement.

Figure 5:
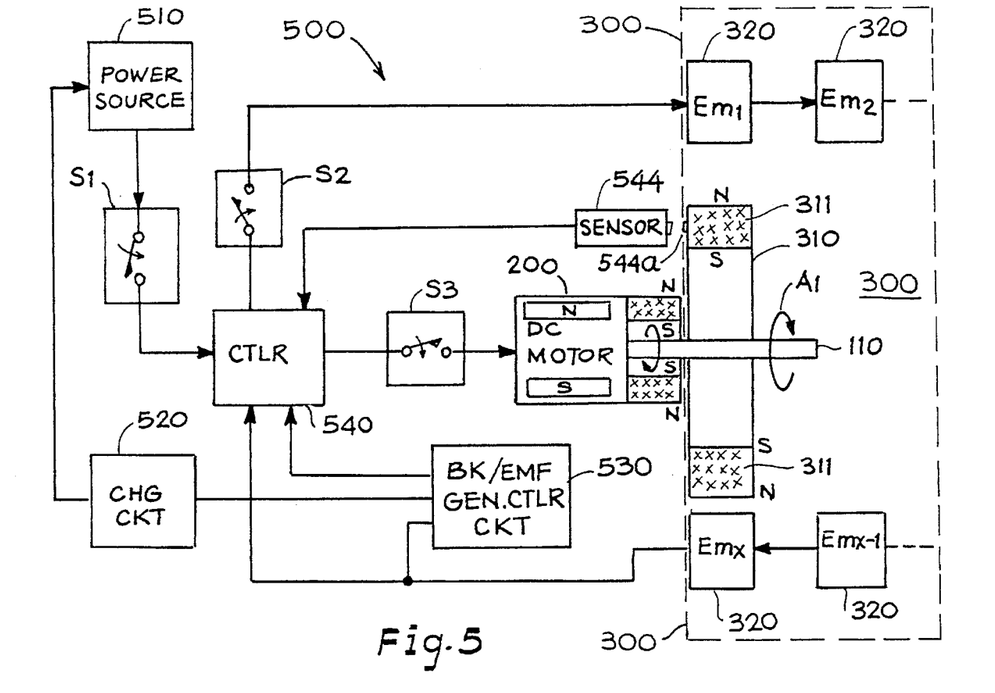
FIG. 5 illustrates a system electrical block diagram showing an energy distribution arrangement for powering both the electromagnetically driven first motor member and the electrically driven second motor member, showing in particular the back-emf/generator circuit that enhances the performance of the system.

Motors 200, 200A, while preferably coupled via shaft 110 to an electromagnetically driven motor 300, may be utilized independently. Similarly, electromagnetically driven motor 300 may be utilized independent of motors 200, 200A. However, the preferred embodiment 100 is as depicted in FIG. 5 showing the combination of both first motor member 300 with second motor member 200. In the preferred embodiment depicted in FIG. 5, the system electrical block diagram 500 shows an energy distribution arrangement including a power controller 540 powering both the electromagnetically driven first motor member 300 and the electrically driven second motor member 200. Controller 540 receives primary power from power source 510 via switch S. Controller 540 then distributes power to motors 200, 300, via switches S2, S3, by factoring the feedback from sensor assembly 544, 544$a$ that determines the timing for pulsing electromagnets 320 ON/OFF, and by utilizing the secondary electrical power distributed via controller circuit 530 from the plurality of electromagnets 320 (Em1, Em2, . . . Emx, Emx-1). Charging circuit 520 charges power source 510 from circuit 530 during periods when power is not being utilized to energize motors 200, 300.

Figure 4:
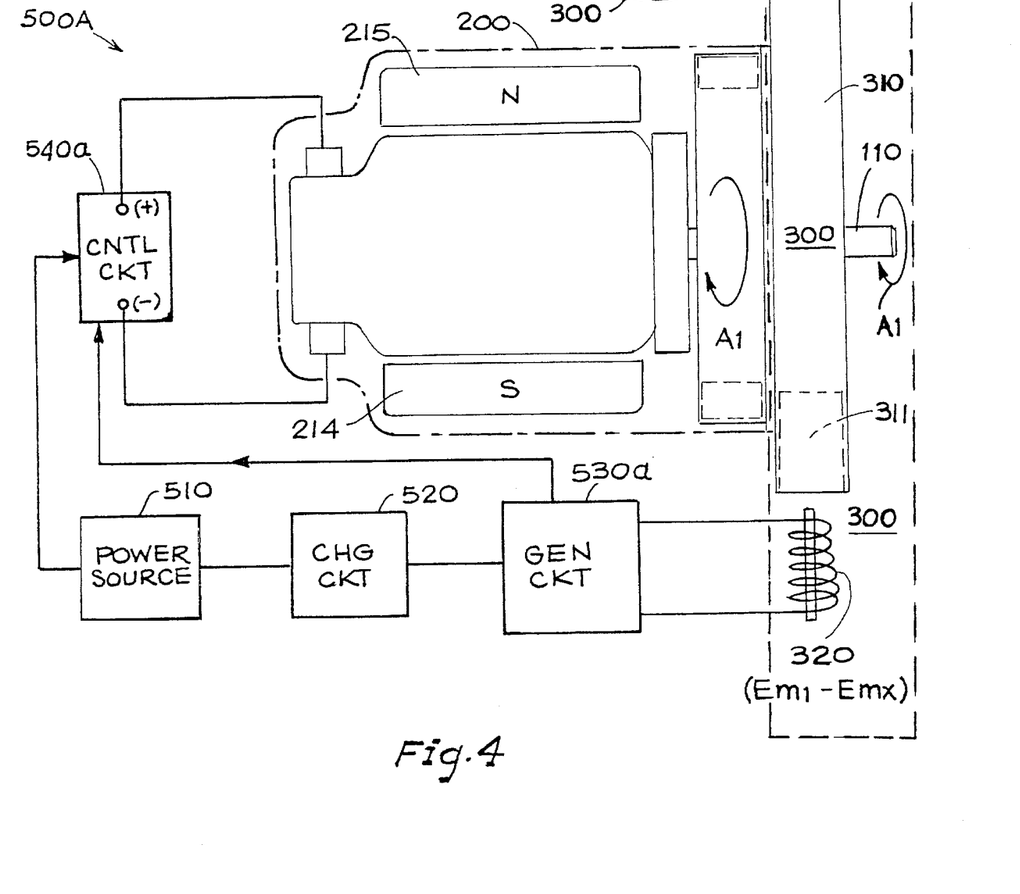
FIG. 4 illustrates a system electrical block diagram showing an energy distribution arrangement for powering the electric motor from a primary power source and from a secondary generated power source originating at the electromagnets and rotating flywheel.

As previously discussed, the secondary electrical energy is produced, either by electrical energy generated by induction caused by flywheel 310, with embedded permanent magnets 311, rotating by de-energized electromagnet members 320, (see generally system 500A depicted in FIG. 4 with controller 540$a$ adapted to distribute power only to motor 200 and with circuit 530$a$ adapted to receive rotationally generated electrical energy from electromagnets 320), or by the electrical back-emf energy produced by the collapsing magnetic fields of the electromagnet members 320 that are periodically de-energized during operation of first motor member 300, (see generally system 500 depicted in FIG. 5 with circuit 530 adapted to distribute both back-emf energy and rotationally generated electrical energy.

Figure 5A:
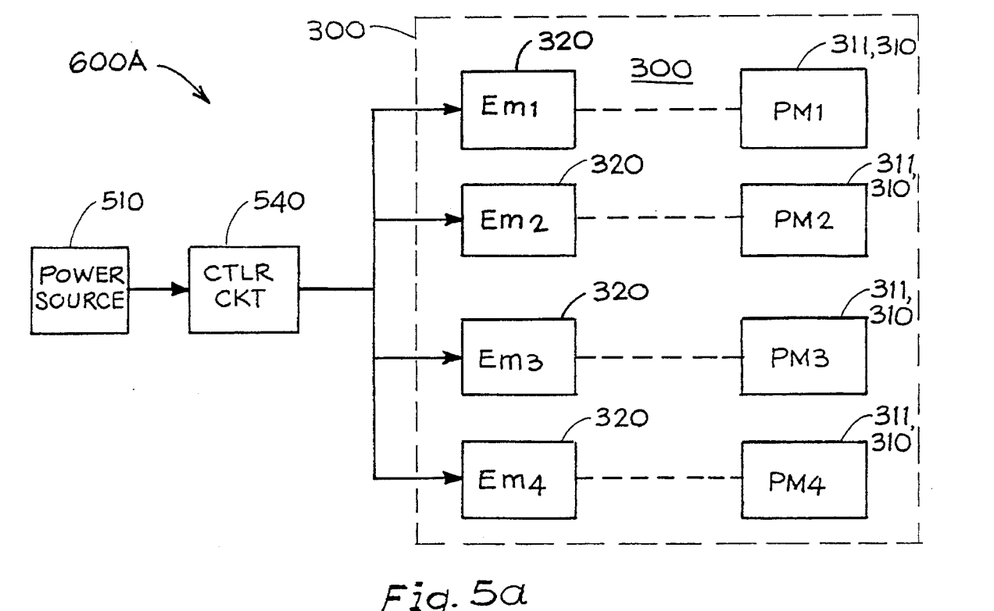
FIG. 5a illustrates a system electrical block diagram showing a parallel energy distribution arrangement for powering the electromagnetically driven first motor member.
Figure 6:
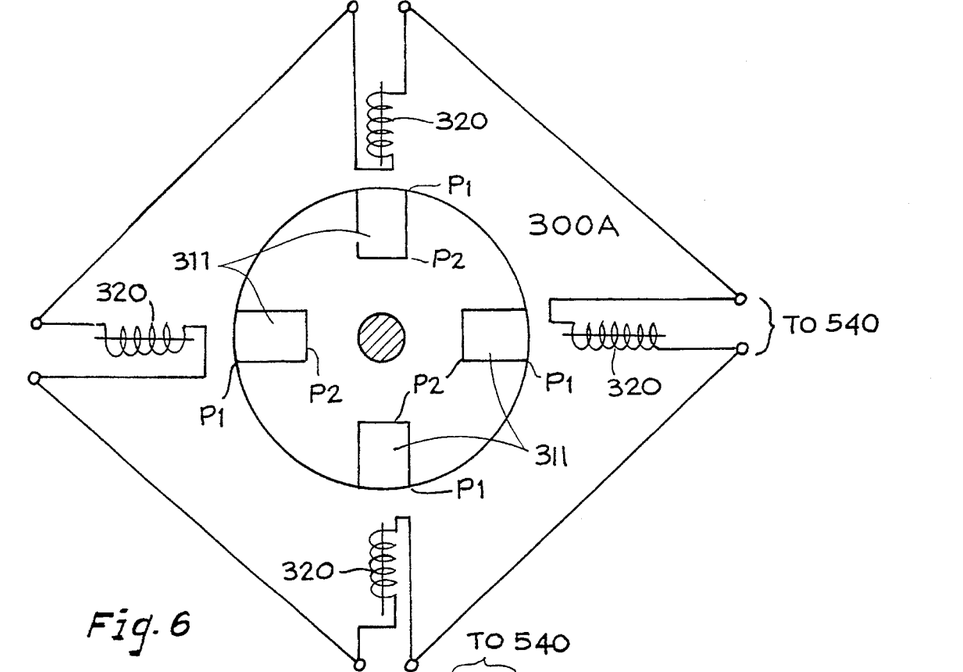
FIG. 6 illustrates a system electrical wiring block diagram showing a series energy distribution arrangement for powering the electromagnetically driven first motor member.
Figure 7:
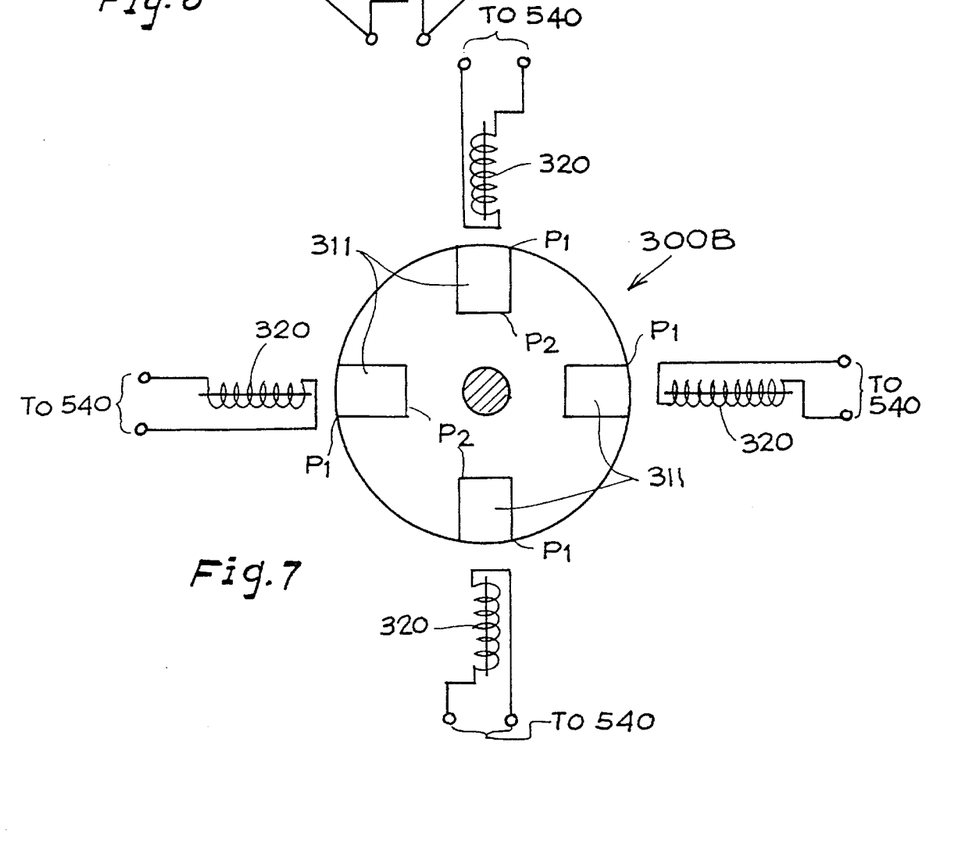
FIG. 7 illustrates a system electrical wiring block diagram showing a parallel energy distribution arrangement for powering the electromagnetically driven first motor member.

FIG. 5$a$ illustrates a system electrical block diagram 600A showing a parallel energy distribution arrangement for powering only the electromagnetically driven first motor member 300. FIG. 6 shows electromagnetically driven motor 300A with permanent magnets 320 electrically interconnected in series, while FIG. 7 shows electromagnetically driven motor 300B with permanent magnets 320 electrically interconnected in parallel. The polarities P1, P2, of the permanent magnets 311, as depicted in FIGS. 6 and 7, are selected in accordance with the desired manner of causing rotation, i.e. by attraction or repulsion interaction with the polarity produced by electromagnets 320. The firing of electrical pulses to operate electromagnets 320 is triggered by sensing the relative location of the permanent magnets to assure continuous rotational movement of flywheel 310.

Figure 10:
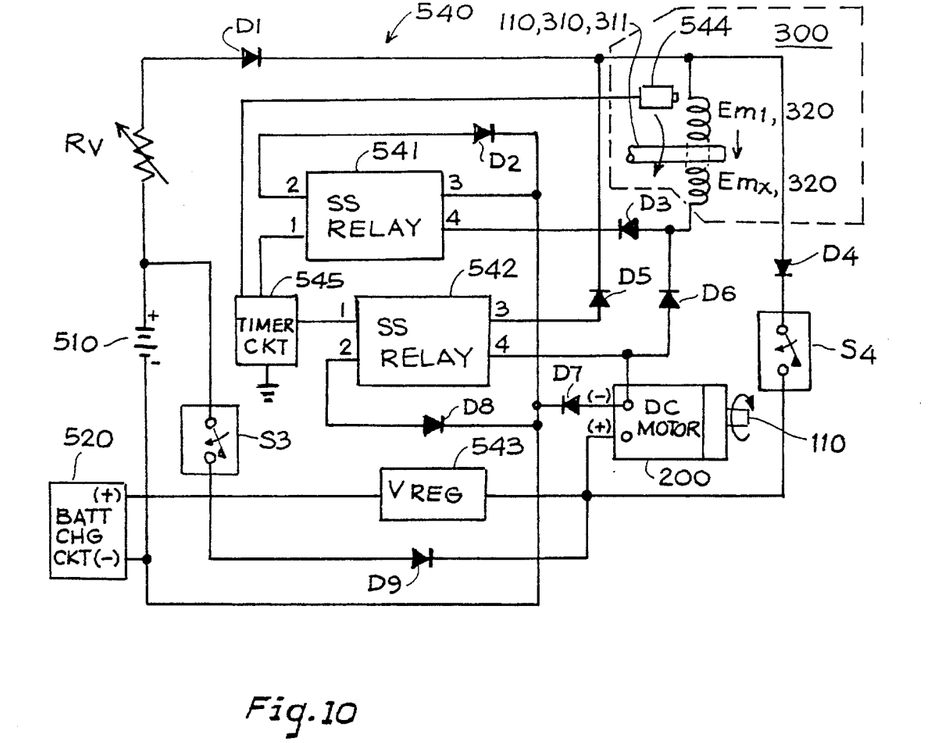
FIG. 10 is an electrical diagram showing a solid state relay and power diode arrangement for controlling power distribution between the first and second motor members, and between the secondary electrical power generation/back-emf portion of the electromagnetically driven first motor member and the electrically driven second motor.

FIG. 10 shows an electrical diagram for controller 540 showing solid state relays 541, 542 and a plurality of power diodes D1, D2, D3, D4, D5, D6, D7, D8, and D9 are biased for controlling power flow distribution from primary power source 510 to first and second motor members 300, 200, and are also biased for controlling the flow of secondary electrical energy produced by induction (diode D4, switch S4) and/or by back-emf energy utilization (diodes D5 and D6). Timing circuit components 544, 545 control the firing of electrical pulses to energize electromagnets 320 (Em1-Emx) by sensing the relative location of the permanent magnets 311 to assure continuous rotational movement of flywheel 310. Variable resistance Rv applies incremental voltages to motor 300, while switch S3 applies rated value of voltage to motor 200. Battery charging circuit 520 stores energy when not being utilized by motors 200, 300 and voltage regulator circuit 543 regulates the voltage applied to motor 200.

FIG. 11 is block diagram of a vehicle 600 depicting the present invention as a component of a vehicle's drivetrain for producing propulsion. As depicted an operator would have access to operator panel 601 for operating controller circuit 540 to energize the motor apparatus 100 from power source 510. Once energized, apparatus 100 would provide rotary power as indicated by arrow A1 at shaft 110. Transmission 610 would regulate the power depicted by arrow A3 to driveshaft 620, differential 630 to produce motion A4 at wheels 640 and corresponding propulsion A5 of vehicle 600.

Therefore, while the present invention has been shown and described herein in what is believed to be the most practical and preferred embodiments, it is recognized that departures can be made therefrom within the scope of the invention, which is therefore not to be limited to the details disclosed herein but is to be accorded the full scope of the claims so as to embrace any and all equivalent apparatus.

We claim:

1. A rotary motor apparatus, said apparatus comprising:

at least one electromagnetically powered first motor member; and at least one electrically powered second member, each of said at least one first motor member and each of said at least one second motor member being powered from a primary power source and being mechanically coupled to each other via a common drive shaft for delivery of produced rotary power, each of said at least one first motor member comprising at least one stationary electromagnet member coupled to said primary power source and being in a magnetically coupled, rotational movement producing relationship with at least one permanent magnet member embedded in a first flywheel member for driving said common drive shaft, each said electromagnet member producing a magnetic field during energization from said primary power source, each of said at least one second motor member being electrically coupled to said at least one first motor member via said at least one electromagnet member for receiving secondary electrical energy from said at least one electromagnet member to enhance rotational speed and torque output power of said apparatus, said secondary electrical energy comprising back-emf energy produced from collapse of said magnetic field during a de-energization period of said at least one electromagnetic member; and a controller means for controlling power distribution from said primary power source and said secondary electrical energy from said at least one electromagnet member.

2. A rotary motor apparatus as described in claim 1, wherein:

said at least one electromagnet member being in a de-energized state, and said secondary electrical energy comprises electrical energy generated by induction during a period when said first flywheel member and said embedded permanent magnets rotate by said de-energized at least one electromagnet member.

3. A rotary motor apparatus as described in claim 1, wherein:

said second motor member comprises at least one stator assembly member, at least one armature member, at least one flywheel member located adjacent said at least one armature member and said at least one stator member, and at least one permanent magnet embedded in a periphery of said at least one flywheel member, said at least one permanent magnet producing a rotating magnetic field that magnetically interacts with a primary magnetic field associated with said at least one stator and armature members.

4. A rotary motor apparatus as described in claim 3, wherein:

said at least one electromagnet member being in a de-energized state, and said secondary electrical energy comprises electrical energy generated by induction during a period when said first flywheel member and said embedded permanent magnets rotate by said de-energized at least one electromagnet member.

5. A rotary motor apparatus, said apparatus comprising:

at least one electromagnetically powered first motor member, each of said at least one first motor member comprising at least one stationary electromagnet member coupled to said primary power source and being in a magnetically coupled, rotational movement producing relationship with at least one permanent magnet member embedded in a first flywheel member that facilitates driving a common drive shaft; and at least one electrically powered second motor member, said at least one second motor member comprising at least one stator assembly member, at least one armature member, at least one flywheel member located adjacent said at least one armature member and said at least one stator member, and at least one permanent magnet embedded in a periphery of said at least one flywheel member, said at least one permanent magnet producing a rotating magnetic field that magnetically interacts with a primary magnetic field associated with said at least one stator and armature members, each of said at least one first motor member and each of said at least one second motor member being powered from a primary power source and being mechanically coupled to each other via said common drive shaft for delivery of rotary power, each said at least one stationary electromagnet member producing a magnetic field during energization from said primary power source, each of said at least one second motor member being electrically coupled via said at least one electromagnet member to said at least one first motor member for receiving secondary electrical energy from said at least one electromagnet member to enhance rotational speed and torque output power of said apparatus, said secondary electrical energy comprising back-emf energy produced from collapse of said magnetic field during a de-energization period of said at least one electromagnetic member; and a controller means for controlling power distribution from said primary power source and said secondary electrical energy from said at least one electromagnet member.

6. A rotary motor apparatus as described in claim 5, wherein:

said at least one electromagnet member being in a de-energized state, and said secondary electrical energy comprises electrical energy generated by induction during a period when said first flywheel member and said embedded permanent magnets rotate by said de-energized at least one electromagnet member.

7. A method of producing rotary power drive, said method comprising the steps of:

(a) providing at least one electromagnetically powered first motor member; and at least one electrically powered second motor member, each of said at least one first motor member and each of said at least one second motor member being powered from a primary power source, and being mechanically coupled to each other via a common drive shaft for delivery of rotary power, each of said at least one first motor member comprising at least one stationary electromagnet member electrically coupled to said primary power source and being in a magnetically coupled, rotational movement producing relationship with at least one permanent magnet member embedded in a first flywheel member for driving said common drive shaft, each said stationary electromagnet member producing a magnetic field upon being energized from said primary power source, each of said at least one second motor member being electrically coupled to said at least one first motor member via said at least one electromagnet member for receiving secondary electrical energy from said at least one electromagnet member to enhance rotational speed and torque output power of said apparatus;

(b) controllably energizing each of said at least one first motor member and each of said at least one second motor member from said primary power source and producing rotary power drive at said common drive shaft;

(c) concurrently producing said secondary electrical energy in the form of back emf energy upon collapse of said magnetic field during each de-energization period of said at least one electromagnetic member; and (d) distributing said produced secondary electrical energy to said at least one second motor member.

8. A method of producing rotary power drive as described in claim 7, wherein:

said step (c) of producing secondary electrical energy by back-emf means, alternatively comprises, producing secondary electrical energy induction at said at least one electromagnet member during a de-energized state of said at least one first motor member.

9. A vehicular apparatus having a drivetrain including a transmission and wheels for effecting propulsion, said apparatus comprising:

a rotary motor apparatus, said apparatus comprising:

at least one electromagnetically powered first motor member; and at least one electrically powered second motor member, each of said at least one first motor member and each of said at least one second motor member being powered from a primary power source and being mechanically coupled to each other via a common drive shaft for delivery of produced rotary power, each of said at least one first motor member comprising at least one stationary electromagnet member electrically coupled to said primary power source and being in a magnetically coupled, rotational movement producing relationship with at least one permanent magnet member embedded in a first flywheel member for driving said common drive shaft, each said at least one stationary electromagnet member producing a magnetic field upon being energized from said primary power source, and producing a secondary electrical energy comprising back-emf energy upon collapse of said magnetic field during a de-energization period of said at least one electromagnetic member, each of said at least one second motor member being electrically coupled to said at least one first motor member via said at least one electromagnet member for receiving said secondary electrical energy from said at least one electromagnet member to enhance rotational speed and torque output power of said apparatus, said common drive shaft being mechanically coupled to said drivetrain for transferring said produced rotary power to said transmission and wheels and propelling said vehicular apparatus.

10. A rotary motor apparatus, said apparatus comprising:

at least one electrically powered motor member, said at least one electrically powered motor member comprising at least one stator assembly member, at least one armature member, at least one flywheel member located adjacent said at least one armature member and said at least one stator member, and at least one permanent magnet embedded in a periphery of said at least one flywheel member, said at least one permanent magnet producing a rotating magnetic field that magnetically interacts with a primary magnetic field associated with said at least one stator and armature members.

11. A rotary motor apparatus as described in claim 10, said apparatus further comprising:

at least one magnetically powered motor member comprising at least one stationary electromagnet member magnetically coupled with at least one rotatable permanent magnet member embedded in a first flywheel member for driving said driveshaft, each said at least one stationary electromagnet member producing a magnetic field upon being energized from said primary power source, and producing a secondary electrical energy comprising back-emf energy upon collapse of said magnetic field during a de-energization period of said at least one electromagnetic member, each of said at least one second motor member being electrically coupled to said at least one first motor member via said at least one electromagnet member for receiving said secondary electrical energy from said at least one electromagnet member to enhance rotational speed and torque output power of said apparatus.

* * * * *